(12) United States Patent
Lee

(10) Patent No.: US 8,355,445 B2
(45) Date of Patent: Jan. 15, 2013

(54) METHOD AND APPARATUS FOR PROCESSING AN IMAGE

(75) Inventor: Jae-hoon Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 482 days.

(21) Appl. No.: 12/573,954

(22) Filed: Oct. 6, 2009

(65) Prior Publication Data
US 2010/0104019 A1    Apr. 29, 2010

(30) Foreign Application Priority Data
Oct. 24, 2008  (KR) .................. 10-2008-0104785

(51) Int. Cl.
*H04N 7/12* (2006.01)
(52) U.S. Cl. .............................. 375/240.16; 375/240.02
(58) Field of Classification Search ............. 375/240.16, 375/240.02
See application file for complete search history.

(56) References Cited

U.S. PATENT DOCUMENTS

| | | | |
|---|---|---|---|
| 5,886,743 A * | 3/1999 | Oh et al. ................. | 375/240.02 |
| 6,104,434 A * | 8/2000 | Nakagawa et al. ...... | 375/240.16 |

* cited by examiner

*Primary Examiner* — Joseph Ustaris
*Assistant Examiner* — Anner Holder
(74) *Attorney, Agent, or Firm* — Drinker Biddle & Reath LLP

(57) ABSTRACT

A method and apparatus for processing an image. The method and apparatus may each perform the operations of extracting motion information of an input signal calculating true motion information, which indicates whether an object of interest moves and an area where the object of interest moved, from the motion information, and deinterlacing the input signal by using the motion information with respect to an area that is determined to have true motion, such that the input signal is in a form before being compressed for transmission. The method and apparatus may further perform an operation of converting resolution of the deinterlaced input signal. In the converting of the resolution, the resolution may be converted by using the true motion information and the motion information.

8 Claims, 5 Drawing Sheets

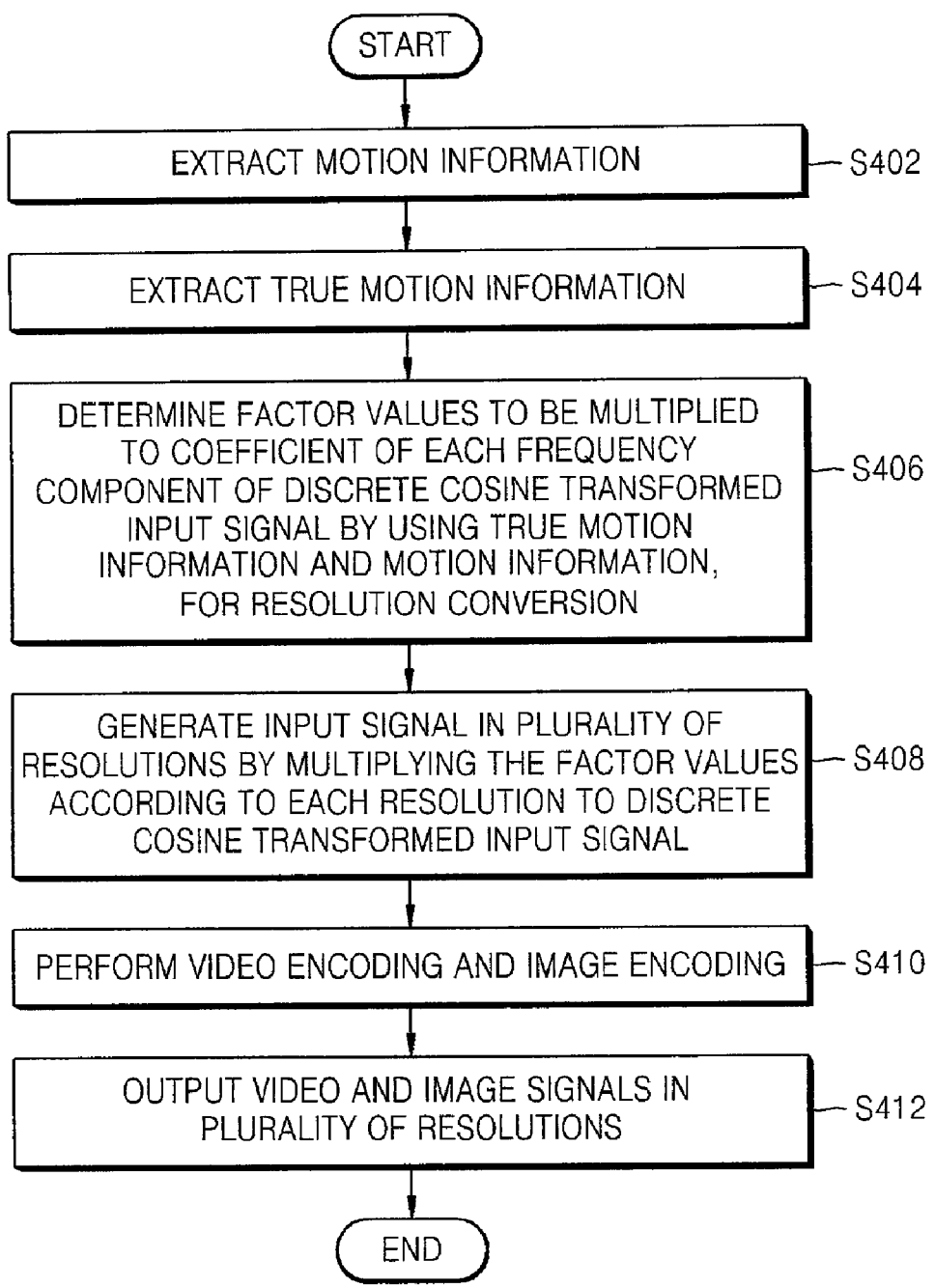

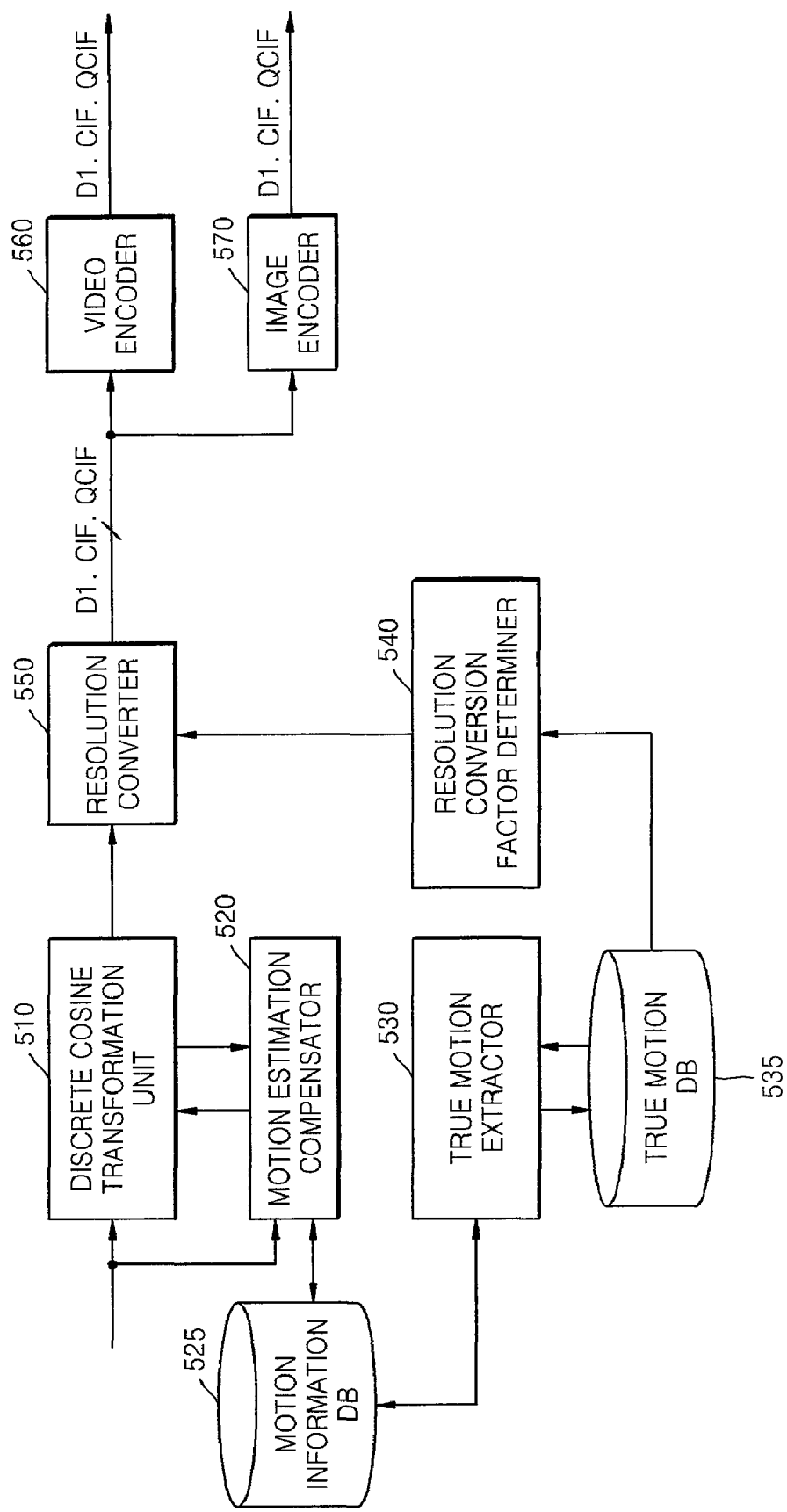

METHOD AND APPARATUS FOR PROCESSING AN IMAGE

CROSS-REFERENCE TO RELATED PATENT APPLICATION

This application claims the benefit of Korean Patent Application No. 10-2008-0104785, filed on Oct. 24, 2008, in the Korean Intellectual Property Office, the entire content of which is incorporated herein by reference.

BACKGROUND OF THE INVENTION

1. Field of the Invention

The present invention relates to a method and apparatus for processing an image, which receive an image and audio signal and compress the image and audio signal.

2. Description of the Related Art

As network technology has developed, network devices that provide various functions have appeared. A conventional codec used in Internet protocol (IP) network devices is realized using hardware or software, and has a structure for transmitting 1 channel output with respect to 1 channel input. Also, the conventional codec provides only 1 output in each channel even when there are multichannel inputs. In other words, only 1:1 input/output is possible in conventional IP network devices.

An IP network based image monitoring system independently requires at least 3 streams having a resolution of D1, a common intermediate format (CIF), and a quarter CIF (QCIF) according to each user, with respect to an input image signal. However, since only 1:1 input/output is possible in the conventional IP network devices, a system and method of providing 3 such streams in real time at low cost do not exist.

In other words, when a system includes one codec and the output resolution of the codec is converted according to a request of a user, all users who receive data from the codec must receive data with the converted output resolution. Accordingly, such a codec is unable to provide data having plurality of resolutions corresponding to different user requests. Also, when the resolution of the codec is converted to a high resolution, a user of a network bandwidth that can sufficiently receive a codec output stream in high resolution does not have any problem receiving the stream, but clients using a low speed network may be unable to smoothly receive the codec output stream.

When the number of codecs is increased to 3 so as to provide the 3 streams in real time, expenses for making the device increase, and the number of output resolutions is still limited by the number of codecs. Also, an image captured in an IP network device may be input in an interlace method. When a signal received in the interlace method is compressed and transmitted to a client or to another network device requesting the signal, the client or the other network device must perform a deinterlace operation in order to reproduce the signal.

SUMMARY OF THE INVENTION

The present invention provides a method and apparatus for processing an image, which deinterlace an input image and then transmit the deinterlaced input image to a client or to another network device that requested the input image. The present invention also provides a method and apparatus for processing an image, which deinterlace an input image by using motion information of an input signal and true motion information indicating whether there is a motion of an object of interest in an image. The present invention further provides a method and apparatus for processing an image, which generate an output in a plurality of resolutions by using one codec.

Accordingly, an embodiment of the present invention provides a method of processing an image. The method includes extracting motion information of an input signal, calculating true motion information, which indicates whether an object of interest moves and an area where the object of interest moved, from the motion information, and deinterlacing the input signal by using the motion information with respect to an area that is determined to have true motion, such that the input signal is a signal before being compressed for transmission. The method may further include converting a resolution of the deinterlaced input signal. In the converting of the resolution, the resolution may be converted by using the true motion information and the motion information.

Another embodiment of the present invention provides an apparatus for processing an image. The apparatus includes a true motion extractor, which extracts true motion information indicating whether an object of interest moves and an area where the object of interest moved from motion information of an input signal, and a deinterlacer which deinterlaces the input signal by using the motion information with respect to the area where the object of interest moved indicated in the true motion information, such that the input signal is a signal before being compressed for transmission. The apparatus may further include a resolution converter which converts a resolution of the deinterlaced input signal by using the true motion information and the motion information.

A further embodiment of the present invention provides a method of processing an image. The method includes converting an input signal to a signal in a frequency domain, extracting motion information from the input signal, and extracting true motion information, which indicates whether an object of interest moved and an area where the object of interest moved, from the motion information of the input signal. The method further includes determining a factor value to be multiplied by each frequency component of the input signal in the frequency domain by using the true motion information and the motion information, so as to convert resolution of the input signal, and converting the resolution of the input signal in the frequency domain by multiplying the factor value by each frequency component. In determining the factor value, the factor value may be determined by only using the motion information in the area where the object of interest moved, when the true motion information indicates that the object of interest moved. The determining of the factor value may include determining each factor value for a plurality of resolutions, and the converting of the resolution may include converting the input signal in the frequency domain to have the plurality of resolutions by multiplying each factor value by the input signal in the frequency domain.

Still a further embodiment of the present invention provides an apparatus for processing an image. The apparatus includes an input signal converter, which converts an input signal to a signal in a frequency domain, a motion information extractor, which extracts motion information from the input signal, and a true motion extractor, which extracts true motion information indicating whether an object of interest moves and an area where the object of interest moved from the motion information of the input signal. The apparatus further includes a resolution conversion factor determiner, which determines a factor value to be multiplied by each frequency component of the input signal in the frequency domain by using the true motion information and the motion information, so as to convert a resolution of the input signal, and a resolution converter, which converts the resolution of the input signal in the frequency domain by multiplying the factor value by each frequency component.

BRIEF DESCRIPTION OF THE DRAWINGS

The above and other features and advantages of the present invention will become more apparent by describing in detail exemplary embodiments thereof with reference to the attached drawings in which:

FIG. 4 is a flowchart illustrating an example of a method of processing an image for generating an output in a plurality of resolutions by using one codec, according to an embodiment of the present invention; and FIG. 5 is a diagram illustrating an example an apparatus for processing an image for generating an output in a plurality of resolutions by using one codec, according to an embodiment of the present invention.

DETAILED DESCRIPTION OF THE EMBODIMENTS

Hereinafter, exemplary embodiments of the present invention will be described more fully with reference to the accompanying drawings. The detailed descriptions and accompanying drawings are for understanding operations of the exemplary embodiments of the present invention, and descriptions that may be easily realized by one of ordinary skill in the art may be omitted herein. Also, the detailed descriptions and drawings provided are not intended to limit the scope of the invention, and terms used in the present specification are interpreted as meaning and concepts correspond to technical aspects of the present invention.

Figure 1:
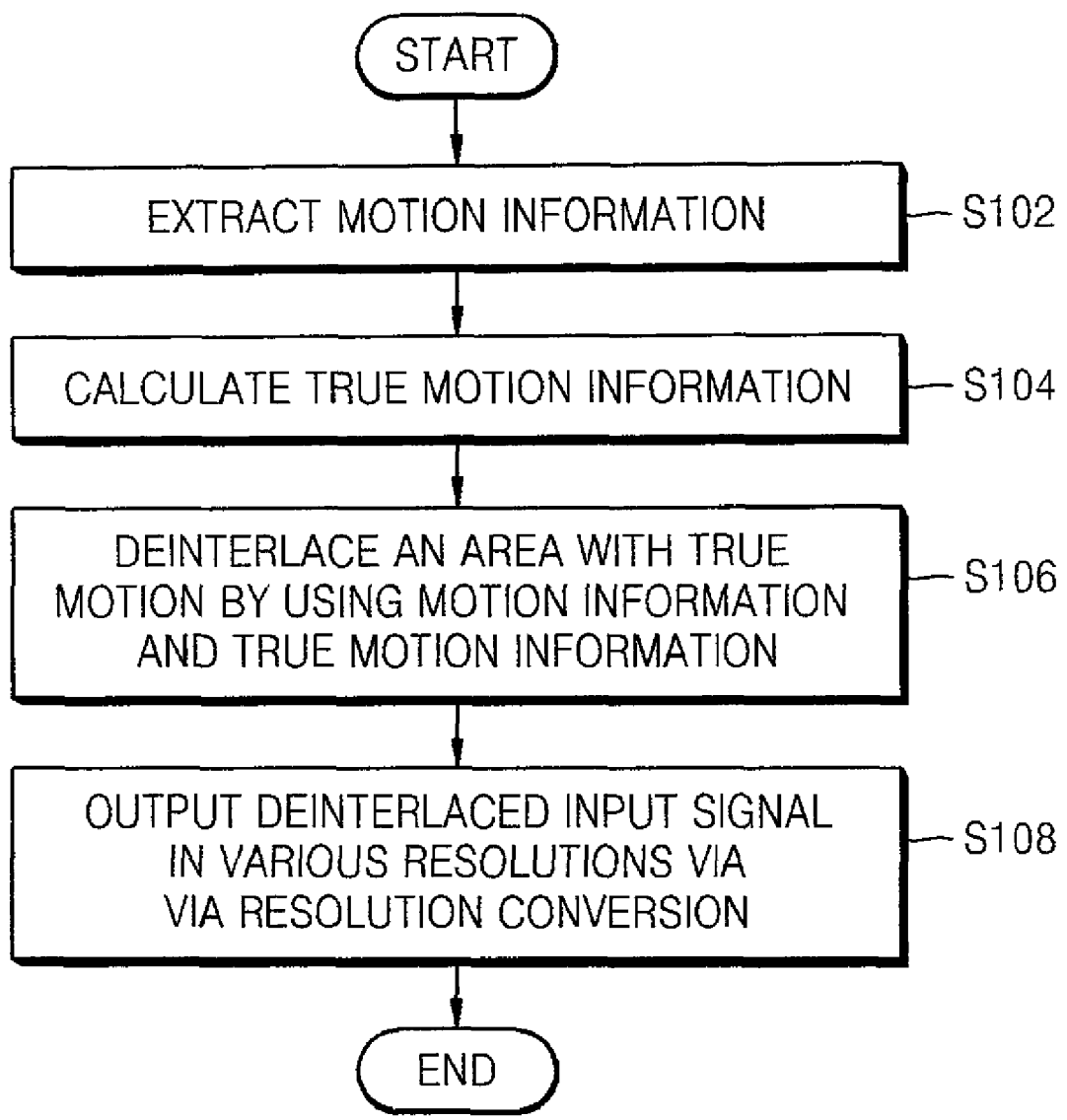
FIG. 1 is a flowchart illustrating an example of a method of processing an image for deinterlacing an input signal, according to an embodiment of the present invention.

FIG. 1 is a flowchart illustrating an example of a method of processing an image for deinterlacing an input signal, according to an embodiment of the present invention. The method according to this embodiment of the present invention deinterlaces an input signal by using motion information and true motion information, and outputs the deinterlaced input signal in a plurality of resolutions.

According to the method, when the input signal is received, motion information is extracted from the input signal in operation S201. The motion information may be a motion vector indicating motion of an object according to a frame change.

When the motion information is extracted, true motion information is extracted in operation S104. True motion in this example means that when an input signal changes according to time, the change is due to motion of an object of interest. Also, the true motion information indicates whether the object of interest moves and an area where the object of interest moved. The input signal is deinterlaced considering the true motion and the resolution of the input signal is changed. Accordingly, information about an area related to motion of the object of interest may be accurately transmitted.

The true motion information may be extracted from the motion information. For example, when there is motion in the input signal, the method determines whether the motion is motion of the object of interest (true motion) or motion occurred as a photographing direction of an image signal input unit of an apparatus for processing an image abnormally changes (not true motion). Accordingly, when the number of objects of interest changes in the input signal, or when the motion information detected from the input signal is motion information about an object of interest, it is determined that motion in the input signal is true motion. The true motion information may be accumulated (e.g., continuously accumulated) in a true motion database (DB) 360 that will be described later with reference to FIG. 3. When the true motion information is extracted, an area of the input signal including the true motion is deinterlaced by using the true motion information and the motion information in operation S106.

According to this embodiment of the present invention, the area with the true motion in the input signal (e.g., only the area with the true motion in the input signal) is deinterlaced by using the motion information. The deinterlacing of the input signal by using the motion information may accurately express the input signal, but a lot of time and resources are used. Accordingly, by deinterlacing the area (e.g., only the area) where the object of interest moved by using the motion information, accurate information about an area of interest is transmitted, and the deinterlacing time does not excessively increase.

A motion compensation mechanism, in which a direction of motion is predicted by using a motion vector and a value that is changed by the motion is pre-compensated, is reflected in the deinterlacing using the motion information. Then, the resolution of the deinterlaced input signal is converted, thereby outputting the deinterlaced input signal in several resolutions in operation S108. In the method, the true motion information and the motion information may be used while converting the resolution. In other words, while converting the resolutions, pixel values in the area with the true motion may be changed by considering a motion vector.

Figure 2:
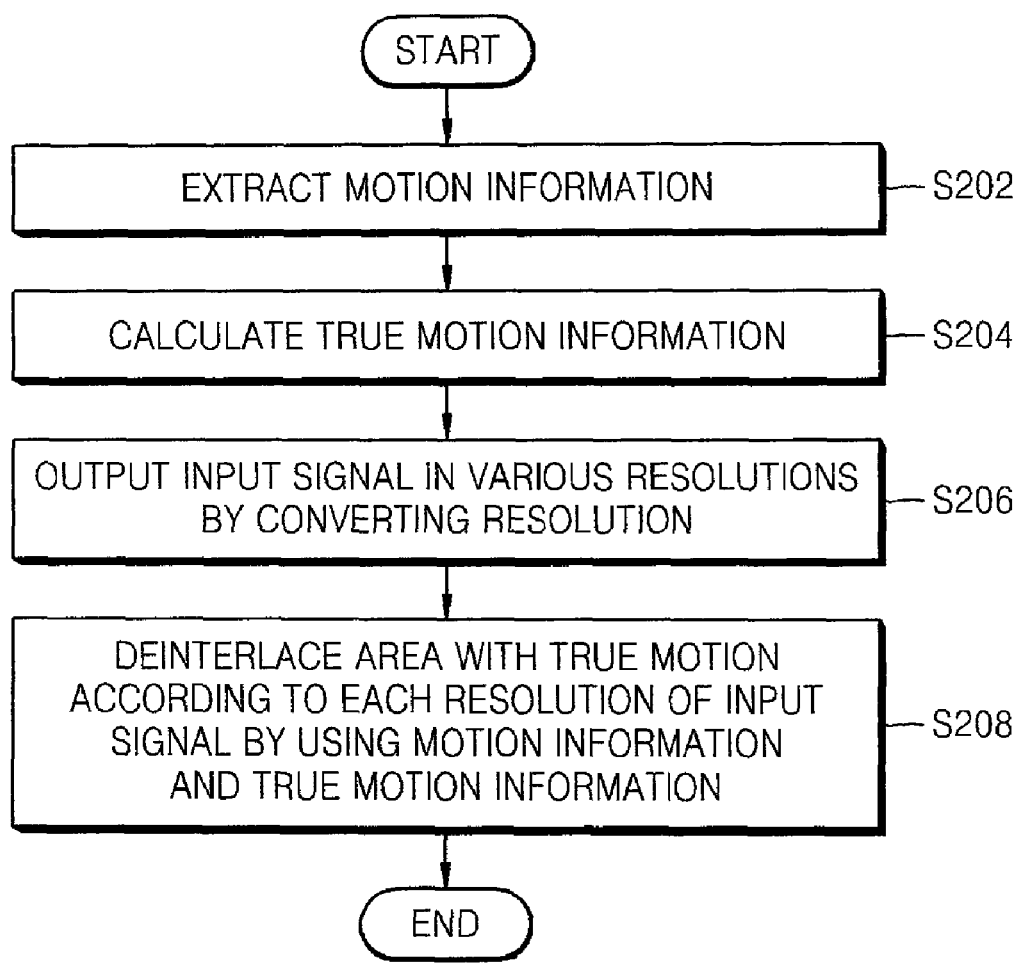
FIG. 2 is a flowchart illustrating an example of a method of processing an image for deinterlacing an input signal, according to another embodiment of the present invention.

According to the method, the deinterlaced input signal may be additionally passed through a low pass filter and post-processed so as to increase sharpness. FIG. 2 is a flowchart illustrating an example of a method of processing an image for deinterlacing an input signal, according to another embodiment of the present invention. Steps S202 and S204 are similar to steps S102 and S104 as described above.

However, unlike the method illustrated in FIG. 1, the method according to this embodiment of the present invention may convert the resolution of the input signal first, and then deinterlace the input signal in various resolutions. In other words, the input signal having a plurality of resolutions is generated by converting the resolution of the input signal in operation S206, and then each resolution of the input signal is deinterlaced by using the true motion information and the motion information in operation S208.

Figure 3:
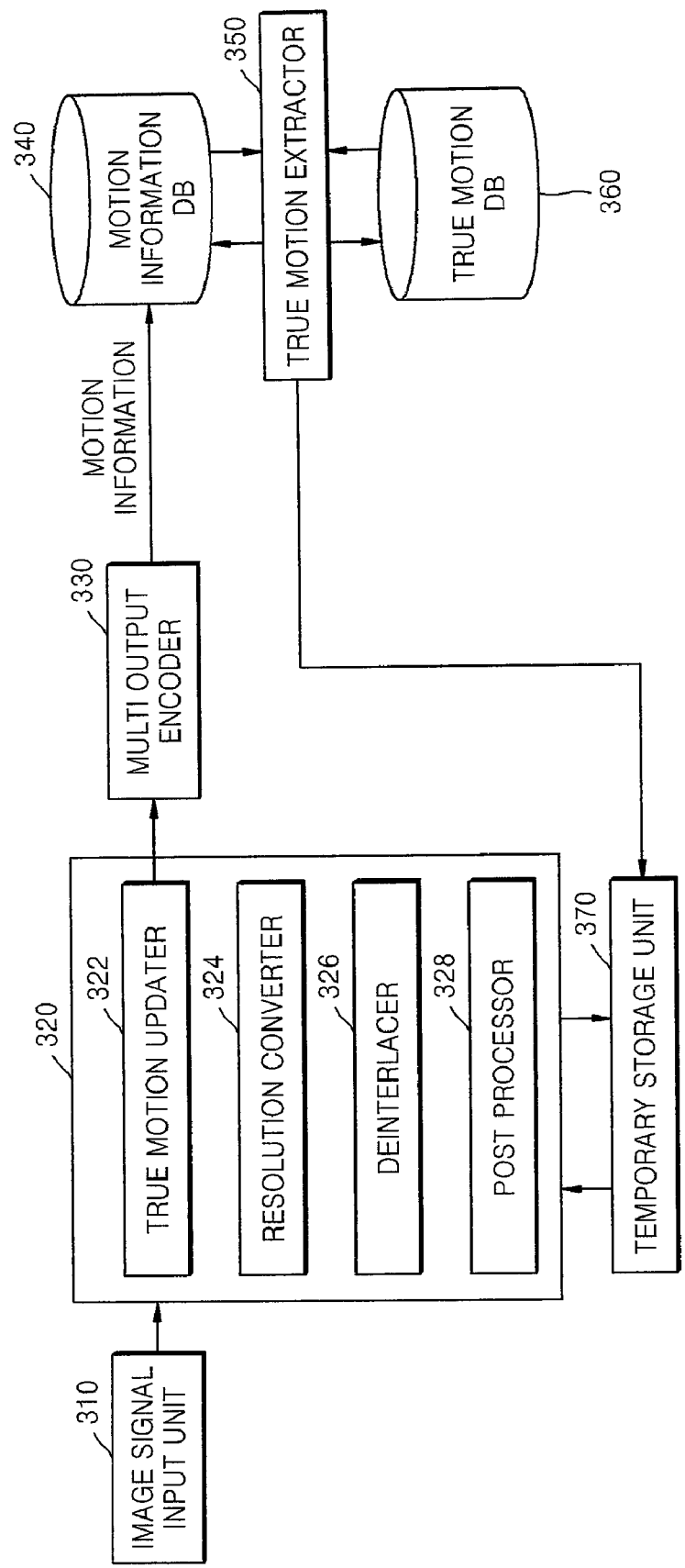
FIG. 3 is a diagram illustrating an example of an apparatus for processing an image for deinterlacing an input signal, according to an embodiment of the present invention.

FIG. 3 is a diagram illustrating an example of an apparatus for processing an image for deinterlacing an input signal, according to an embodiment of the present invention. The apparatus includes a true motion extractor 350 and a deinterlacer 326. The apparatus may further include a multi output encoder 330, a motion information DB 340, a temporary storage unit 370, a true motion updater 322, a resolution converter 324, a post processor 328, and an image signal input unit 310.

The image signal input unit 310 receives an input signal. The input signal may be input in an analog form and converted to a digital form. The form of the image signal input unit 310 is not limited as long as the input signal is received, and examples of the image signal input unit 310 include a camera and a camcorder.

The true motion extractor 350 extracts true motion information by using motion information stored in the motion information DB 340. The apparatus may further include a true motion DB 360, and the true motion extractor 350 may extract true motion information and store the true motion information in the true motion DB 360.

The true motion information extracted by the true motion extractor 350 may be used when the deinterlacer 326 deinterlaces the input signal or when the resolution converter 324 converts the resolution of the input signal. The true motion information is temporarily stored in the temporary storage unit 370, updated (e.g., continuously updated) by the true motion updater 322, and may be used by the resolution converter 324 and the deinterlacer 326.

The resolution converter 324 outputs the input signal in a plurality of resolutions by converting the resolution of the input signal. The deinterlacer 326 deinterlaces the input signal by using the true motion information and the motion information. The deinterlacer 326 deinterlaces and then transmits the input signal to the resolution converter 324 so that the resolution converter 324 converts the resolution of the input signal. According to another embodiment, the resolution of the input signal may be converted in the resolution converter 324 so as to generate the input signal in a plurality of resolutions, and then the input signal may be deinterlaced in the deinterlacer 326 according to each resolution.

The post processor 328 passes the deinterlaced input signal through a low pass filter, and increases the sharpness of the deinterlaced input signal. The deinterlaced input signal is transmitted to the multi output encoder 330 for image compression. Here, the multi output encoder 330 is an element for extracting the motion information. Accordingly, the multi output encoder 330 extracts (e.g., continuously extracts) the motion information of the input signal, and stores the extracted motion information in the motion information DB 340.

FIG. 4 is a flowchart illustrating an example of a method of processing an image for generating an output in a plurality of resolutions by using one codec, according to an embodiment of the present invention. According to the method, an input signal is converted to a signal in the frequency domain. The input signal is converted to the signal in the frequency domain by using an input signal in an intermediate resolution from among a plurality of resolutions that will be output from an apparatus for processing an image.

In operation S402, motion information is extracted from the input signal. In this example, the motion information may be a motion vector. When the motion information is extracted, true motion information is extracted by using the motion information in operation S404. A process of extracting the true motion information is similar to that as described with reference to FIGS. 1 through 3.

Then, a factor value that is to be multiplied by a coefficient of each frequency component of a discrete cosine transform output for resolution conversion is determined in operation S406 by using the true motion information and the motion information. According to the method, the input signal is converted into a signal in the frequency domain, and then generates the input signal in a plurality of resolutions, and thus the plurality of resolutions are obtained by using one codec. Also by using the method according to this embodiment of the present invention, processes of converting the input signal into a signal in the frequency domain and extracting the motion information, which have large throughput, are performed once, and then the plurality of resolutions are obtained. Accordingly, the processing time and throughput are remarkably reduced compared to a conventional system which performs processes of converting to a signal in the frequency domain and extracting motion information on each resolution of the input signal.

An example of the process of converting the input signal into a signal in the frequency domain includes discrete cosine transformation (DCT). According to the current embodiment of the present invention, DCT is performed on the input signal in only one resolution, the motion information is extracted, and then factor values for resolution conversion are multiplied by the DCT transformed input signal so as to obtain the DCT transformed input signal in other resolutions in operation S408. The factor values are obtained according to each resolution. The factor values are each multiplied by the coefficient of each frequency component of the DCT transformed input signal. The factor values are obtained by considering the true motion information and the motion information, and thus the DCT transformed input signal in other resolutions obtained by multiplying the factor values may have accurate information regarding the motion of an object. The factor values may be determined by searching for pre-stored information according to values of the true motion information and the motion information.

Then, video encoding and image encoding are performed on the input signal that is converted into a signal in the frequency domain in the plurality of resolutions so as to obtain a compressed video signal and a compressed image signal in operation S410. In operation S412, the compressed video and image signals in the plurality of resolutions are output.

FIG. 5 is a diagram illustrating an example of an apparatus for processing an image for generating an output in a plurality of resolutions by using one codec, according to an embodiment of the present invention. The apparatus may include a motion estimation compensator 520, a true motion extractor 530, a resolution conversion factor determiner 540, a resolution converter 550, a motion information DB 525, a true motion DB 535, a video encoder 560, and an image encoder 570.

The apparatus of FIG. 5 is used to convert an input signal into a signal in the frequency domain, and will be described by using DCT. When an input signal is received, the input signal is transmitted to a DCT unit 510 so as to be converted to a signal in the frequency domain. The motion estimation compensator 520 extracts motion information, for example, a motion vector, and performs motion compensation by using the motion information. The motion information extracted in the motion estimation compensator 520 is stored in the motion information DB 525. The DCT unit 510 may convert the input signal into a signal in the frequency domain by using an input signal in an intermediate resolution from among a plurality of resolutions that will be output from the apparatus.

The true motion extractor 530 extracts true motion information by using the motion information stored in the motion information DB 525. Information for extracting the true motion information and the extracted true motion information are stored in the true motion DB 535.

The resolution conversion factor determiner 540 determines factor values for resolution conversion by using the motion information and the true motion information. Also, the resolution converter 550 obtains the DCT transformed input signal in a plurality of resolutions by multiplying the factor values by a coefficient of each frequency component of the DCT transformed input signal. The DCT transformed input signal in each resolution is transmitted to the video encoder 560 and the image encoder 570, and thus a compressed video signal and a compressed image signal are generated.

As can be appreciated from the above, in the exemplary embodiments of the present invention, an input signal is deinterlaced before being compressed, and thus a network device or a client that receives the input signal does not need to deinterlace the input signal. Accordingly, throughput of the network device or the client is reduced. Also, by deinterlacing the input signal by using true motion information and motion information, the motion of an object is accurately expressed, and deinterlacing performance is improved. Moreover, by outputting the input signal in a plurality of resolutions from one codec, the input signal in the plurality of resolutions are output according to a request of a user with low throughput.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of processing an image, the method comprising:
   converting an input signal to a signal in a frequency domain;
   extracting motion information from the input signal;
   extracting true motion information, which indicates whether an object of interest moved and an area where the object of interest moved, from the motion information of the input signal;
   determining a factor value to be multiplied by each frequency component of the input signal in the frequency domain by using the true motion information and the motion information, so as to convert resolution of the input signal; and
   converting the resolution of the input signal in the frequency domain by multiplying the factor value by each frequency component,
   wherein in the determining of the factor value, the factor value is determined by using the motion information in the area where the object of interest moved, when the true motion information indicates that the object of interest moved.

2. The method of claim 1, wherein the determining of the factor value comprises determining each factor value for a plurality of resolutions, and
   the converting of the resolution comprises converting the input signal in the frequency domain to have the plurality of resolutions by multiplying each factor value by the input signal in the frequency domain.

3. The method of claim 1, further comprising:
   performing video compression on the input signal in the frequency domain according to each of the plurality of resolutions; and
   performing image compression on the input signal in the frequency domain according to each of the plurality of resolutions.

4. The method of claim 1, wherein the converting of the input signal comprises converting the input signal having an intermediate resolution from among the plurality of resolutions to the signal in the frequency domain.

5. An apparatus for processing an image, the apparatus comprising:
   an input signal converter, which converts an input signal to a signal in a frequency domain;
   a motion information extractor, which extracts motion information from the input signal;
   a true motion extractor, which extracts true motion information indicating whether an object of interest moves and an area where the object of interest moved from the motion information of the input signal;
   a resolution conversion factor determiner, which determines a factor value to be multiplied by each frequency component of the input signal in the frequency domain by using the true motion information and the motion information, so as to convert a resolution of the input signal; and
   a resolution converter, which converts the resolution of the input signal in the frequency domain by multiplying the factor value by each frequency component,
   wherein the resolution conversion factor determiner determines the factor value by using the motion information in the area where the object of interest moved, when the true motion information indicates that the object of interest moved.

6. The apparatus of claim 5, wherein the resolution conversion factor determiner determines factor values for each of a plurality of resolutions, and the resolution converter converts the input signal in the frequency domain to the plurality of resolutions by multiplying the factor values by the input signal in the frequency domain.

7. The apparatus of claim 5, further comprising:
   a video encoder which performs video compression on the input signal in the frequency domain according to each of the plurality of resolutions; and
   an image encoder which performs image compression on the input signal in the frequency domain according to each of the plurality of resolutions.

8. The apparatus of claim 5, wherein the input signal converter converts the input signal having an intermediate resolution from among the plurality of resolutions to the signal in the frequency domain.

* * * * *